April 23, 1935.  W. D. BURGER ET AL  1,999,032
CHUCK
Filed Dec. 24, 1931  3 Sheets-Sheet 1
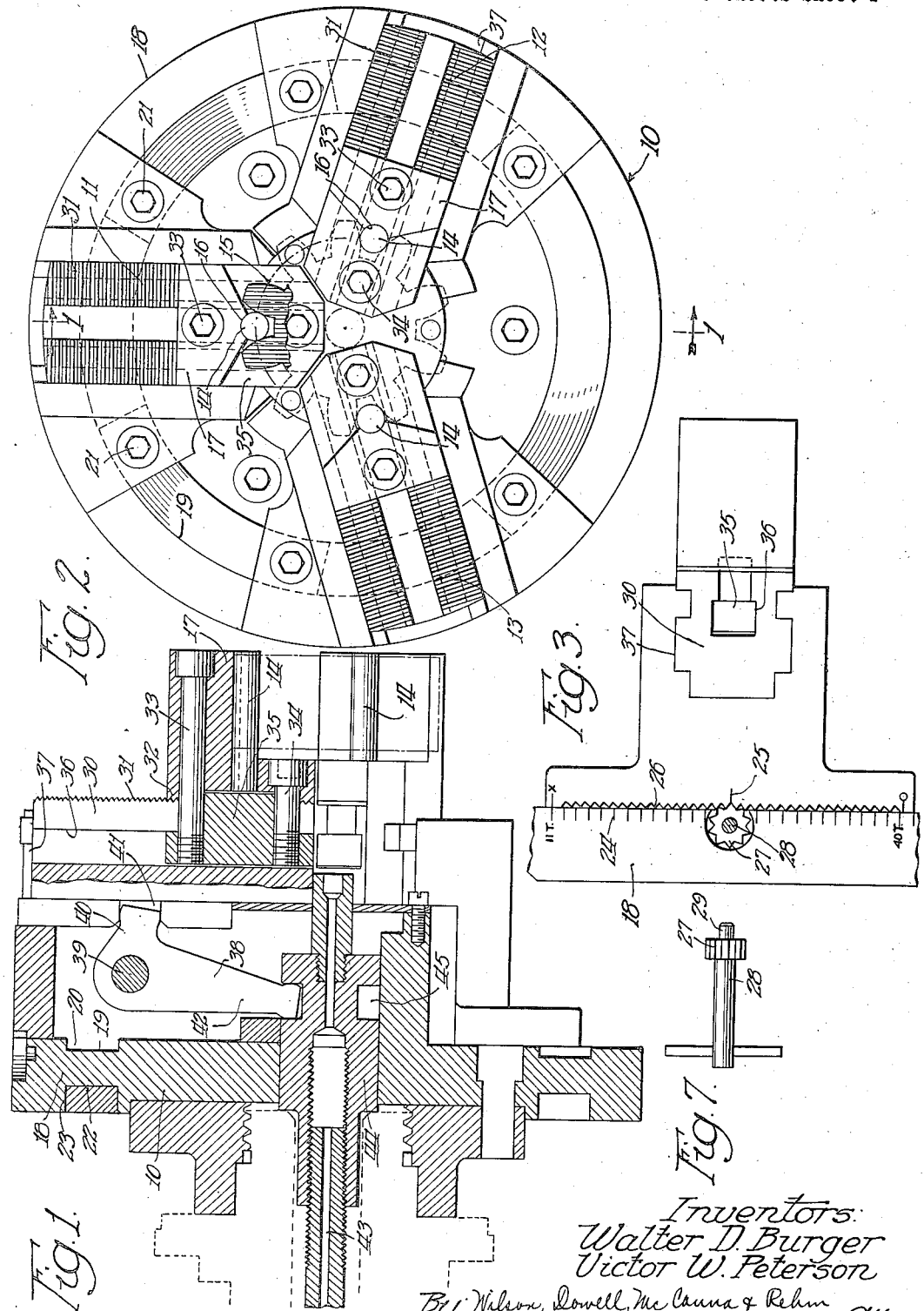
Inventors:
Walter D. Burger
Victor W. Peterson
By Wilson, Dowell, McCanna & Rehm
Attys

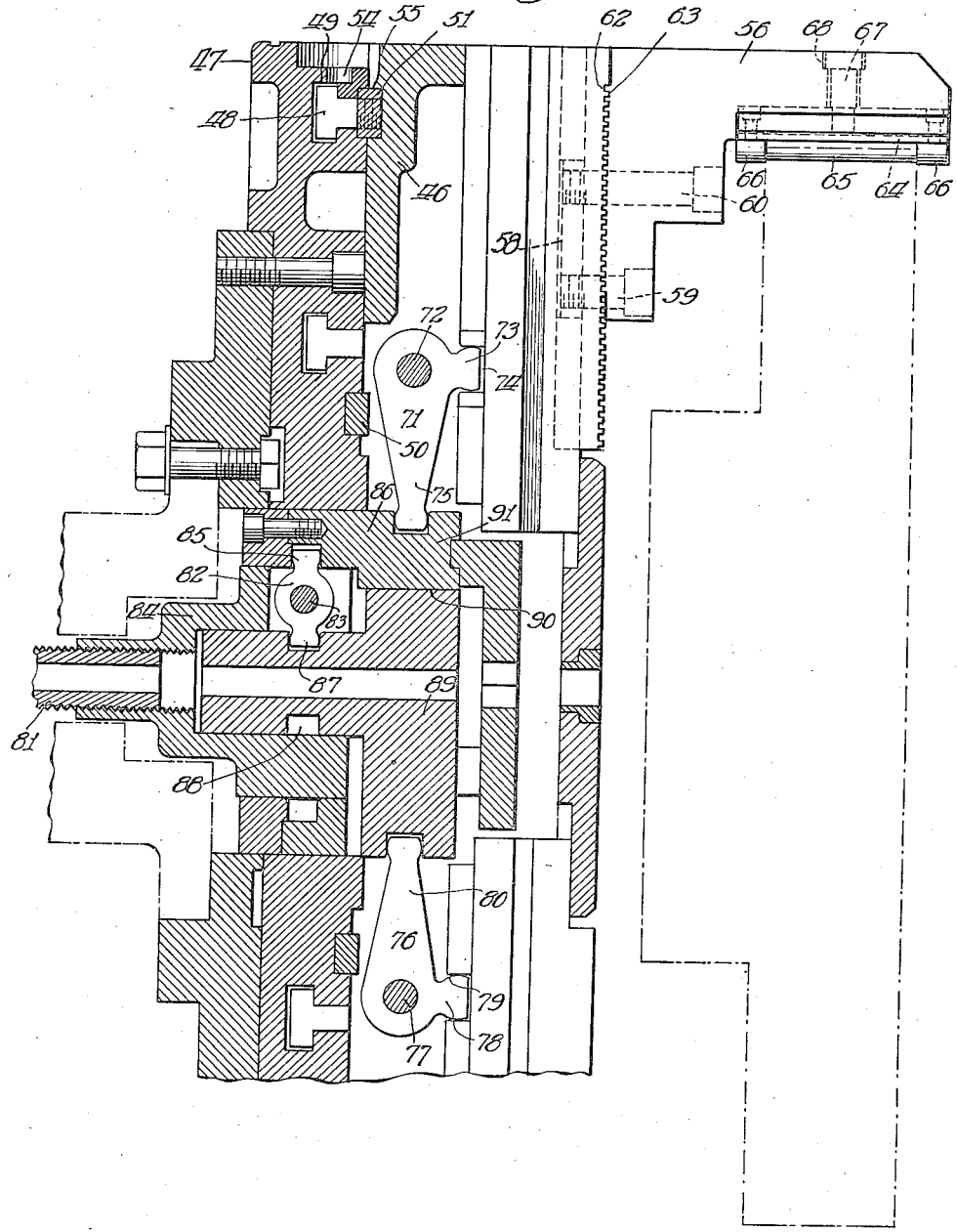

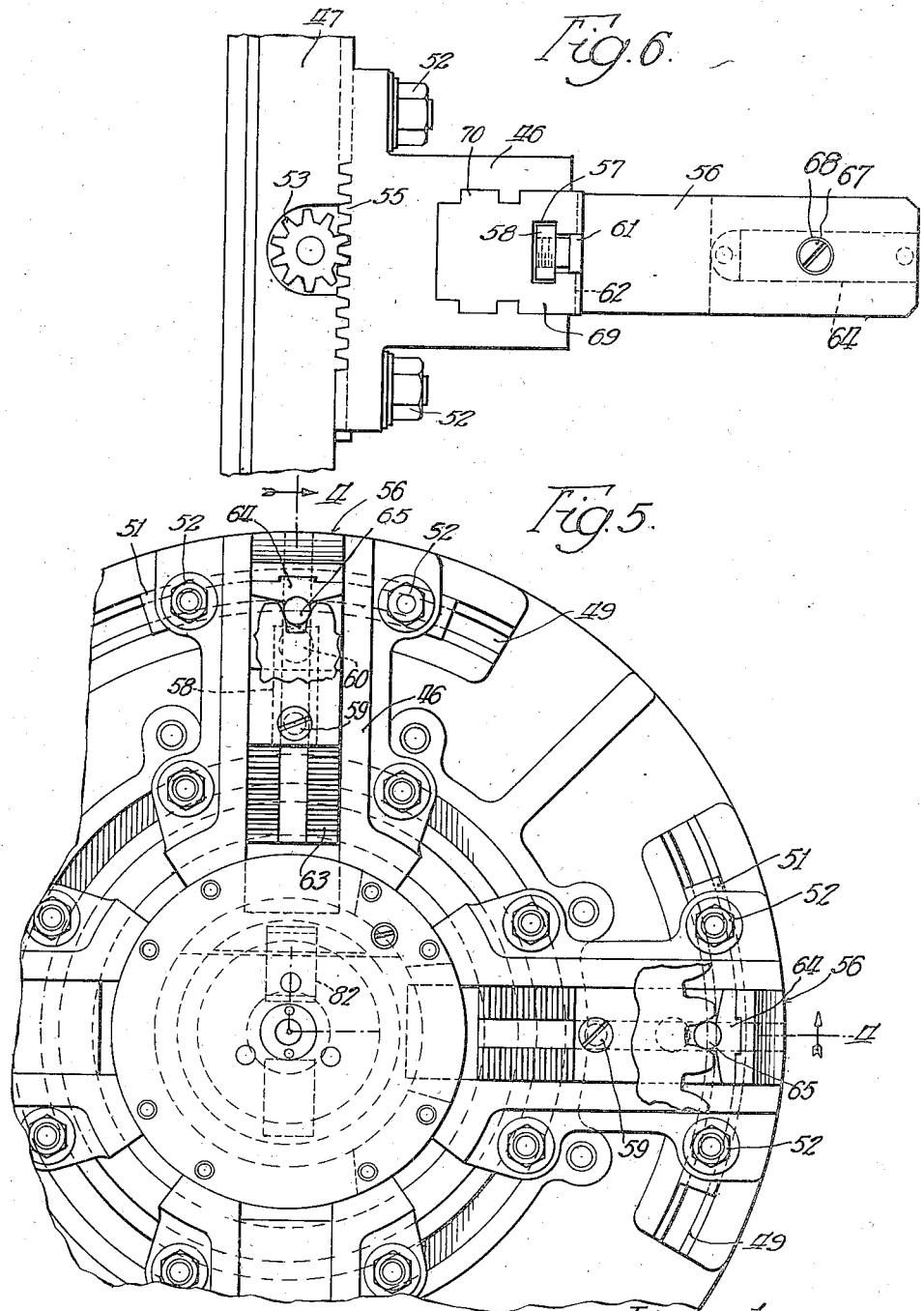

Patented Apr. 23, 1935

1,999,032

UNITED STATES PATENT OFFICE 1,999,032

CHUCK

Walter D. Burger, Forest Park, and Victor W. Peterson, Chicago, Ill., assignors to Hannifin Manufacturing Co., Chicago, Ill., a corporation of Illinois Application December 24, 1931, Serial No. 582,922

3 Claims. (Cl. 279—119)

This invention relates to chucks, and among other objects aims to provide a chuck for holding articles which require a refinishing or trueing operation to render them accurate.

The nature of the invention may be readily understood by reference to illustrative constructions embodying the same and shown in the accompanying drawings.

In said drawings:

Fig. 1 is an axial section through a three jaw chuck, the section being taken on the plane 1—1 of Fig. 2;

Fig. 2 is a front elevation of the chuck;

Fig. 3 is a plan view looking down upon one of the circumferentially adjustable jaws;

Fig. 4 is an axial section through a multiple jaw chuck embodying compensating jaws and taken on the broken line 4—4 of Fig. 5;

Fig. 5 is a front elevation of the chuck, certain parts having been broken away to permit illustration on a larger scale;

Fig. 6 is a plan view similar to that of Fig. 3, of one of the circumferentially adjustable jaws; and Fig. 7 is an illustration of a key for effecting a circumferential adjustment of the jaw.

The invention is here shown embodied in a chuck for holding gears so that the gear bore may be centrally located and the gear subsequently trued up with a minimum of machining. Gears in common with other circular articles warp somewhat when they cool after being treated to harden or temper their wearing surfaces such as those of the teeth. The warping or distortion may or may not be generally regular—when the gear bore has a key way the stresses set up on cooling after heating usually cause the bore to widen transversely through the key way, giving the pitch line of the gear a somewhat elliptical shape.

This distortion requires that the gear be trued up, particularly throughout the active portions of the gear teeth surfaces and, of course, at the bore of the gear, if it has been bored previously to the heat treatment. To minimize the amount of costly re-machining of the gear teeth, the gear is centered diametrically relative to its pitch line, instead of relatively to the periphery of the gears; and the gear is then bored, reamed or ground to center its bore accurately relatively to the chucked pitch line. After this only a minimum of machining of the gear teeth will be necessary—because of the clearances generally allowed beyond the ends of the teeth and between the teeth, no machining at these points becomes necessary. In other words, if the gear bore has previously been centered relatively to the pitch line and re-bored or reamed on such center, slight irregularities occurring at the ends and between the teeth will not interfere with the proper operation of the gear, since these jaws of the teeth do not contact with any portion of a meshing gear. It is merely necessary, therefore, to true up the active portions of the gear teeth surfaces. This reduces the trueing up machining to a minimum. On the other hand, since the gear is not centered on the periphery of the gear teeth, the irregularities at said periphery do not influence the re-boring, reaming or grinding operation nor require that the teeth be re-machined relative to a portion of the gear, (its periphery) whose accuracy is not essential to a proper operation of the gear.

In Figs. 1, 2 and 3 are illustrated a three jaw chuck 10 whose jaw structures 11, 12 and 13 are relatively circumferentially adjustable to adapt them to effect a pitch line chucking of gears having various numbers of teeth. The gear engaging portions of the jaws are provided with replaceable devices 14 which enter between a pair of gear teeth and engage the teeth at or very slightly outside the pitch line 15. As here shown, these devices are in the form of short cylinders which rest in curved recesses 16 in the lower faces of the projecting jaw members 17. The gear engaging members 14 are replaceable by others of varying diameter to accommodate the particular gear tooth spacing desired so as to secure engagement of the gear teeth substantially at the pitch line, thereby effecting a chucking of the gear at the pitch line. The recesses 16 in which the cylinders 14 rest are slightly larger than the cylinders to permit the cylinders to move laterally slightly to center themselves absolutely between the gear teeth.

Because of variation of the numbers of gear teeth in various gears, it is necessary to effect a circumferential adjustment of the jaws if a given chuck is to be generally useful. While this function would not be necessary in a three jaw chuck for any gears whose teeth were a whole multiple of three, it is necessary for other gears. For example, with the ten tooth gear, here shown chucked in Fig. 2, the jaws could not be equally spaced angularly through an angle of 120°, since the centers of the jaws would not then all register with a space between two gear teeth and a chucking of the gear on its pitch line could not be effected.

In the present instance, to provide such relative circumferential adjustment, at least two of the jaws are made circumferentially adjustable. As here shown the structure of the movable jaw is made movable on the base plate 18 of the chuck about the axis of the chuck as a center. Guiding means for this axial movement is here provided in the form of an arcuate groove 19 in the face plate in which the projecting rib 20 of the jaw housing slides and by which the jaw housing is constrained to move in an arc of a circle whose center coincides with the axis of the chuck. The jaw housing is clamped in its circumferentially adjusted position by appropriate means such as bolts and nuts 21 carried by the jaw housing and anchored through slots in the base plate 18 to slidable keys or straps 22 which operate in curved grooves 23 in the back of the base plate 18.

Preferably, some means is provided for securing the proper angular adjustment of the jaws for a given gear, such for example as a scale 24 on the periphery of the base plate 18 employed in conjunction with a center mark 25 on the jaw housing. The scale may advantageously be in degrees and fractions thereof, and by consultation with an appropriate chart the setting for any desired number of gear teeth may be readily effected. For example, the chart may be designed to give the angular deviation (for a given number of gear teeth) from the normal 120° spacing between jaws—if the chuck have three jaws. Obviously the means by which the angular setting may be determined may be considerably varied. It is evident that the angular deviation for a given number of gear teeth would be the same for all gear diameters. A radial adjustment of the jaws would, of course, be necessary to accommodate gears of different diameters.

Further to facilitate the setting of the movable jaws, a portion of the jaw face adjacent the base plate 18 may be provided with a series of rack teeth 26. The jaw may then be moved in a clockwise or counter-clockwise direction by a pinion 27 mounted in the base plate 18 and meshing with the rack teeth. As here shown, the pinion is carried upon a removable key 28 having a pilot projection 29 which enters a hole in the base plate and thus centers the pinion. After an adjustment has been effected by rotating the key, the clamping bolts 21 may be tightened and the jaw held in proper position. For three jaw chucks, it is obviously necessary to set only two of the jaws, the other may remain in a fixed position.

As here shown, the jaw members 17 are made radially adjustable by adjustably mounting the same on jaw blocks 30. The adjusting means are here shown in the form of intermeshing teeth 31 and 32 on the jaw block and jaw member respectively, together with clamping bolts 33 and 34 which clamp the jaw member in radially adjusted position. The clamping bolts are here shown anchored to a strap or key 35 which slides radially in an undercut groove 36 in the jaw block. The precise radial adjustment of the jaw members 17 to accommodate a gear of given diameter may be effected with either a gauge corresponding to the pitch diameter of the gear to which all the jaws may be adjusted, or by using the teeth 31 in the jaw block as an index. In the latter case, the teeth in each jaw block being identically spaced relative to the axis of the chuck, could serve as a scale for locating the jaws equi-distant from the axis of the chuck.

The illustrative chuck is here shown provided with convenient means for actuating the jaws to grip a gear or other article to be held. The jaw blocks 30 are here shown radially slidable in undercut grooves 37 in the jaw housing and the body of the jaw blocks within the grooves is shaped to conform exactly to the cross section of the groove to be snugly slidable therein and thereby avoid any lateral play. The jaw blocks are operated in this instance by levers 38 in the form of bell cranks pivoted at 39 within the movable housing. It will be understood that one lever is employed for each jaw. The short arm 40 of each lever operates in a recess 41 in the back of the jaw thereby to move it radially. The longer arms 42 of the levers are operated by a slidable actuating bar 43 and are shown connected therewith by a slidable plunger 44 in whose circumferential grooves 45 the ends of the arms 42 seat. Thus, longitudinal movement of the rod 43 causes the levers to move the jaws in or out simultaneously by an equal amount.

The actuating bar 43 may be controlled by any appropriate means such as air cylinders commonly in use for that purpose. The amount of movement effected by actuation of the levers need, of course, be only a small amount sufficient to permit the release and removal of a chucked gear, since the adjustment of the jaws for varying diameters of gears is effected by other adjusting means above described. It will be understood that upon the circumferential movement of a jaw and its housing, the end of the lever arm 42 will move similarly in the groove 45 of the operating plunger.

After a gear is chucked on the pitch line, its bore is refinished in an appropriate way such as by reaming, to provide a true bore centrally located respecting the pitch line which is the basic or controlling factor of the gear. Thereupon, the gear may be mounted upon the trued bore and the active faces of the gear teeth may be trued up by a minimum of finishing work. As already stated, it will not be necessary to true up either the periphery of the gear or the dedendum at the root of the teeth since neither the latter surfaces nor the ends of the gear teeth contact in actual use. Thus a gear may be restored to its correct outline and true form with a minimum of machining work.

In Figs. 4, 5 and 6 is illustrated a multiple jaw gear—four jaws in this case being shown, in which the respective pairs of opposite jaws are compensated.

As in the three jaw chuck above described, the jaw housings 46 are made circumferentially adjustable relative to the base plate 47 of the chuck. In the present instance, the jaw housings are provided with T headed bolts 48 which operate within arcuate undercut grooves 49 in the base plate. Arcuate guiding keys 50 and 51 carried by the jaw housing and operating in curved, closely fitting grooves in the base plate, serve to constrain the axial movements of the jaw housings to a true circle whose center corresponds with the axis of the chuck. Clamping nuts 52 on the T headed bolts 48 serve to clamp the jaw housings in adjusted position.

As with the three jaw chuck, circumferential movements of the jaw housings may conveniently be effected by an adjusting pinion 53 mounted in a recess 54 in the periphery of the chuck housing and meshing with a series of rack teeth 55 in the inner face of each chuck housing. By mounting the pinion on a key such as shown in Fig. 7, the aforesaid movement may easily be effected.

Associated with each jaw housing may be an adjusting scale such as shown in Fig. 3 in connection with the three jaw chuck. In the four jaw chuck, however, unequal angular spacing of the jaws would be required in all cases where the number of gear teeth was not a whole multiple of four.

The jaw members 56 are made radially adjustable in a manner similar to the three jaw chuck. Each jaw housing is provided with a T-shaped radial groove 57 within which a key or strap 58 slides. Clamping bolts 59 and 60 pass through the jaw members 56 and thread into the key 58. The rear face of the jaw members is provided with a guide rib 61 which snugly slides within the groove 57 to prevent lateral play. The adjacent faces of the jaw member 56 and the jaw housing are provided with meshing teeth 62 and 63 which serve not only to maintain the adjustment of the jaw against any radial movement, but serve as a means for locating the jaws equi-distant from the axis of the chuck. The teeth here shown function similarly to the three jaw chuck above described, but are somewhat square in outline, which in larger chucks may be more easily machined. To release a jaw for adjustment, it is necessary merely to release the clamping screws 59 and 60 sufficiently to permit the teeth 62 and 63 to clear.

The jaw members 56 are provided with a gear engaging pad 64 somewhat different in section than that of the cylinder 14 shown in connection with the three jaw chuck, although the latter form of gear engaging member might be employed. The jaw pad comprises a plate having a projecting rib 65 which extends between a pair of gear teeth and is designed to engage them at their pitch line. For different gear teeth spacings a different pad is employed. At the ends of the rib 65 are stops 66 spaced apart a distance equivalent to the width of the gear face, which serve to hold the gear against the possibility of axial movement. The jaw pads are held to the jaw member by a screw 67 which operates in a somewhat larger hole 68 than necessary merely to receive the bolt, in order to provide a slight tangential play to permit the rib 65 to seat itself accurately between a pair of gear teeth.

The jaw members here shown are designed to chuck gears of larger diameter; but for chucking smaller gears these may be replaced by a different set of jaw members in which the jaw face is located nearer the center relative to the series of teeth 62 and 63 on the jaw housing and jaw members.

Clamping movement of the jaws is here effected by making the jaw blocks 69, which carry the jaw members, slidable radially within the jaw housings 46. As here shown, the housings are provided with undercut grooved guideways 70 and the jaw blocks have a corresponding section to have a snug sliding fit within the guideway.

Opposite jaw blocks are controlled by opposite levers 71 pivoted at 72 within the respective jaw housings. The short lever arms 73 operatively engage recesses 74 in the back of the jaw blocks 69 and are actuated by the longer operating arms 75. The other pair of jaws, i. e., those located at 90° from the first pair is controlled by levers 76 pivoted at 77 within the respective jaw housings. The short lever arms 78 operatively engage recesses 79 in the rear faces of the jaw blocks and are operated by the longer arms 80. Arms 75 and 80 of the respective pairs of levers are connected to the actuating bar 81 in such a way as to have compensating movements, the effect of which is to permit one pair of jaws to move inwardly after the movement of the other pair of jaws has been arrested by engagement with the article to be chucked. Such operation would occur upon the chucking of an article having unequal chucking diameters, as for example, a slightly elliptical shape; one pair of jaws would engage the article such as a gear at the long diameter of the ellipse before the other pair of jaws would engage it at its short diameter. If no compensation of this character were provided, the pair of jaws opposite the small diameter of the ellipse would be inactive since their clamping movement would be arrested when the first pair gripped the gear at its large diameter.

The aforesaid compensating movement is effected by interconnecting the levers 75 and 80. The interconnecting devices are here shown in the form of levers 82 pivoted at 83 within the plunger 84 connected to the end of the actuating bar 81. A plurality of diametrically opposed levers 82 are preferably employed so as to avoid any binding of the parts. The outer ends 85 of the levers in this case operatively engage in recesses in the collar or sleeve 86 which actuate the lever arms 75 of the one pair of jaws. The inner arms 87 of the levers operatively engage recesses 88 in the plunger 89 which actuates the lever arms 80 controlling the other pair of jaws.

To permit the levers 71 and 76 to be located in substantially the same plane, the plunger 89 is recessed at points 90 opposite the lever arms 75 so as to receive the forwardly extending projections 91 on the collar 86. This avoids increasing the thickness of the chuck which would be necessary if the bars of levers 71 and 76 were not located in the same plane.

It will be evident that the levers 82 permit relative movement between the collar 86 and the plunger 89, thus permitting movement of one pair of jaws independently of the other pair. Hence, when force is applied by the bar 81 to levers 82, the jaws will be closed simultaneously until one pair of opposite jaws meets resistance, i. e., when it engages the article to be chucked. This arrests the movement of one end of the levers 82 but does not arrest movement as a whole since the lever 82 will then turn on its pivot and continue to operate the other pair of jaws until they also engage the article to be chucked. The length of the levers 82 is designed to be such as to provide adequate compensating movement. In ordinary cases, this compensating movement is, of course, relatively slight. If the pair of jaws controlled by levers 71 be the first to engage the gear to be chucked, then the arms 85 of the levers stop, but the arms 87 continue to move and operate the other pair of jaws controlled by the levers 76.

In connection with Fig. 4 it should be noted that to facilitate illustration this section is taken on two planes at right angles to each other, and that the levers 76 in the actual chuck are not opposite the levers 71, but spaced 90° therefrom.

Compensating movement of this character is desirable for chucks having oppositely located pairs of jaws, although, of course, it may be embodied in other types of chucks. The compensating feature of the chuck not only improves the clamping grip upon an article which does not have equal chucking radii, but renders it possible to locate the center of the article more nearly centrally of the axis of the chuck.

Obviously the invention is not limited to the details of the illustrative constructions herein shown and described since these may be variously modified. Moreover, it is not indispensable that all features of the invention be used conjointly since various features may advantageously be employed in different combinations and sub-combinations.

Having described our invention, we claim:

1. A chuck of the character described comprising in combination a chuck body having a plurality of jaws mounted thereon and movable about the chuck axis, a rack and pinion at the meeting faces of the movable jaws and chuck body for moving the former about the chuck axis, and clamping means for clamping the jaws against the chuck body.

2. A chuck of the character described comprising in combination a chuck body, a plurality of pairs of opposite radially movable chuck jaws, means for mounting said jaws on said body so as to be movable circumferentially thereon, levers operatively connected with the respective pairs of jaws for moving the same radially to engage and disengage an article, an actuating bar for operating said levers, and a compensating device connecting said bar to said levers to permit one pair of jaws to move toward an article after it has been engaged by another pair of jaws.

3. In apparatus of the character described the combination comprising a chuck having a plurality of pairs of jaws, a pair of concentric sleeves which are independently and longitudinally movable connected with the respective pairs of jaws for moving the latter, a lever between and engaging said sleeves with its respective ends, and an actuating bar for applying power to said sleeves and connected at the fulcrum of said lever to transmit force thereto for moving said jaws, said lever being adapted to rock relative to said bar to allow said pairs of jaws an independent compensating movement to grip a piece of work whose outer surface is eccentric.

WALTER D. BURGER.
VICTOR W. PETERSON.